T. S. MILLER.
TOWING ENGINE.
APPLICATION FILED FEB. 19, 1918.
1,320,023.
Patented Oct. 28, 1919.
4 SHEETS—SHEET 1.
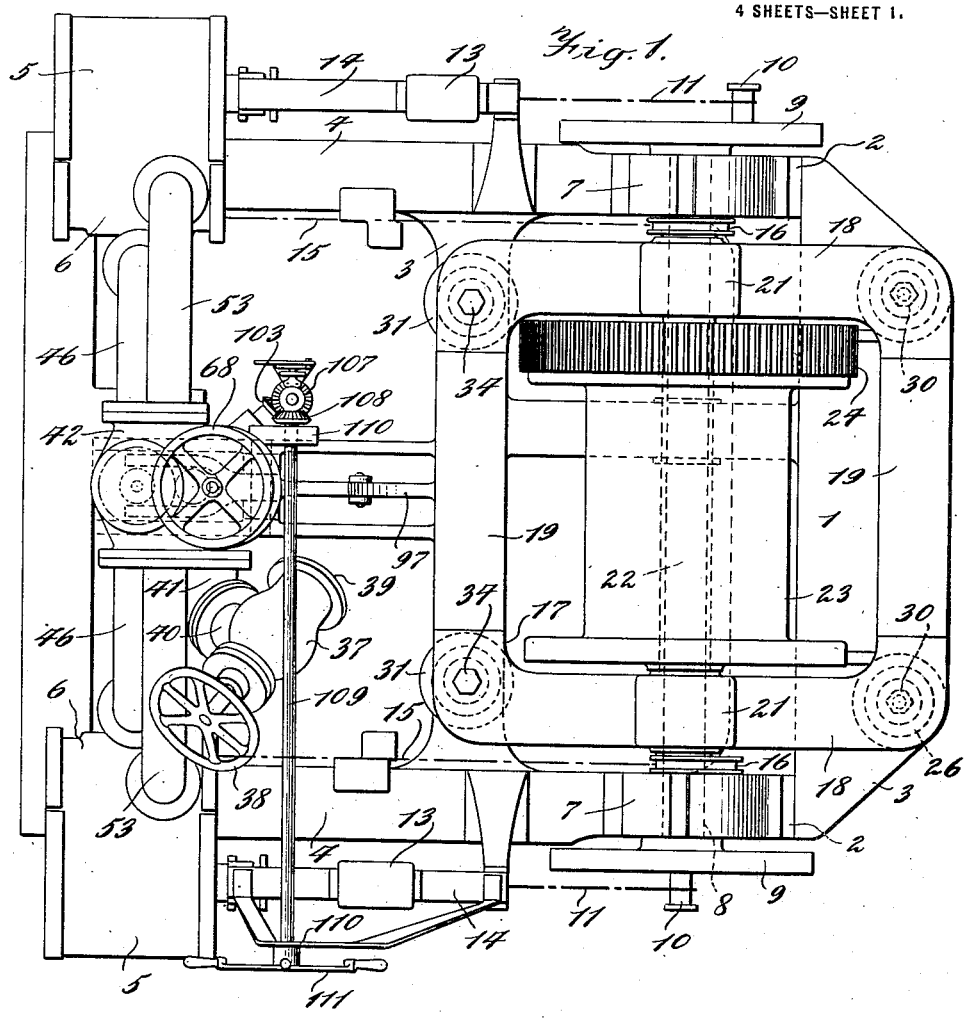
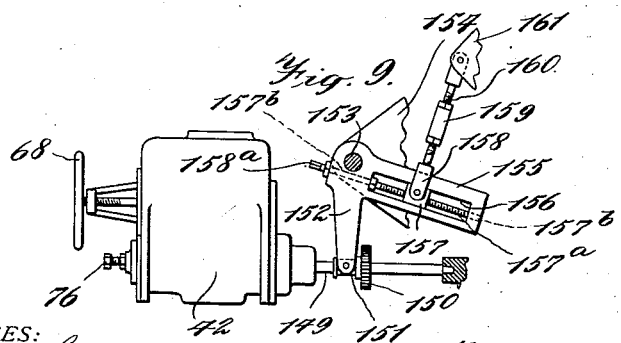
WITNESSES:
INVENTOR.
Thomas Spencer Miller
BY Gifford Bull
his ATTORNEYS T. S. MILLER.
TOWING ENGINE.
APPLICATION FILED FEB. 19, 1918.
1,320,023.
Patented Oct. 28, 1919.
4 SHEETS—SHEET 2.
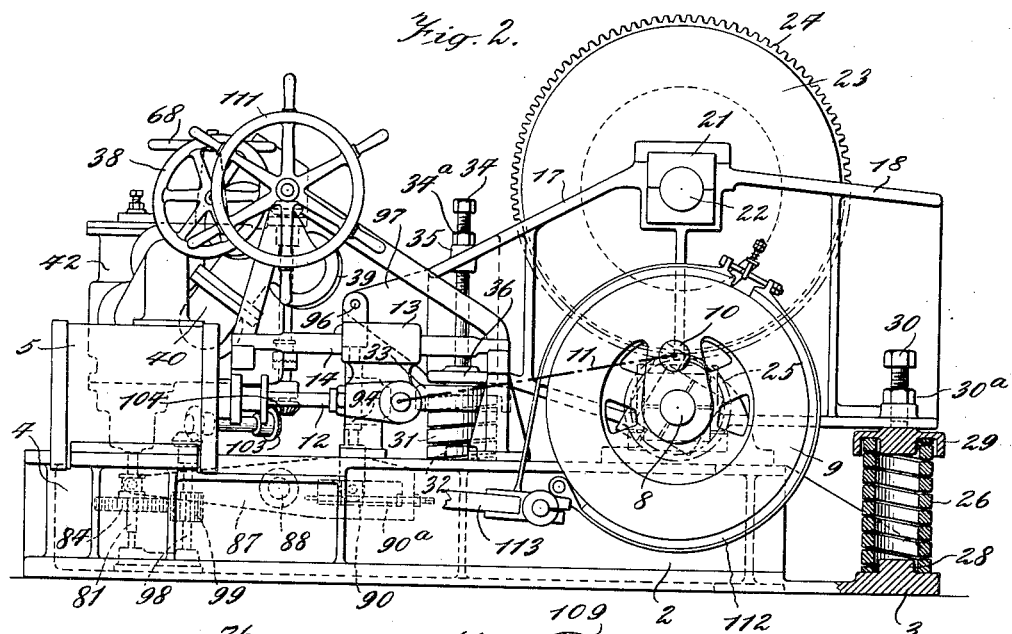
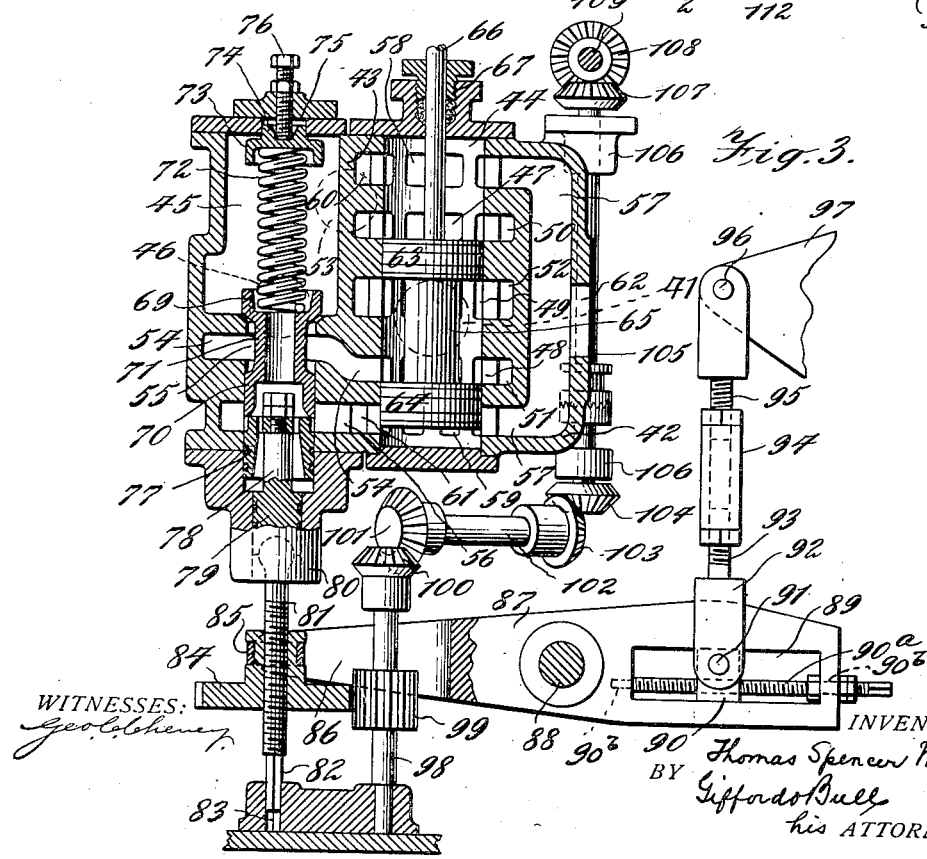

T. S. MILLER.
TOWING ENGINE.
APPLICATION FILED FEB. 19, 1919.

1,320,023.

Patented Oct. 28, 1919.
4 SHEETS—SHEET 3.

WITNESSES:

INVENTOR.
Thomas Spencer Miller
BY Gifford Bull
his ATTORNEYS

T. S. MILLER.
TOWING ENGINE.
APPLICATION FILED FEB. 19, 1918.
1,320,023.
Patented Oct. 28, 1919.
4 SHEETS—SHEET 4.
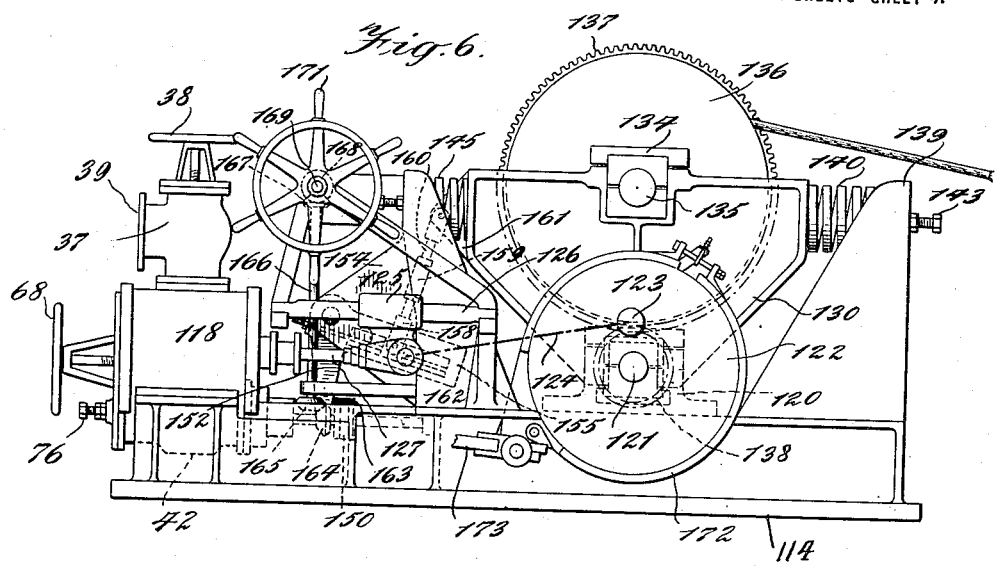
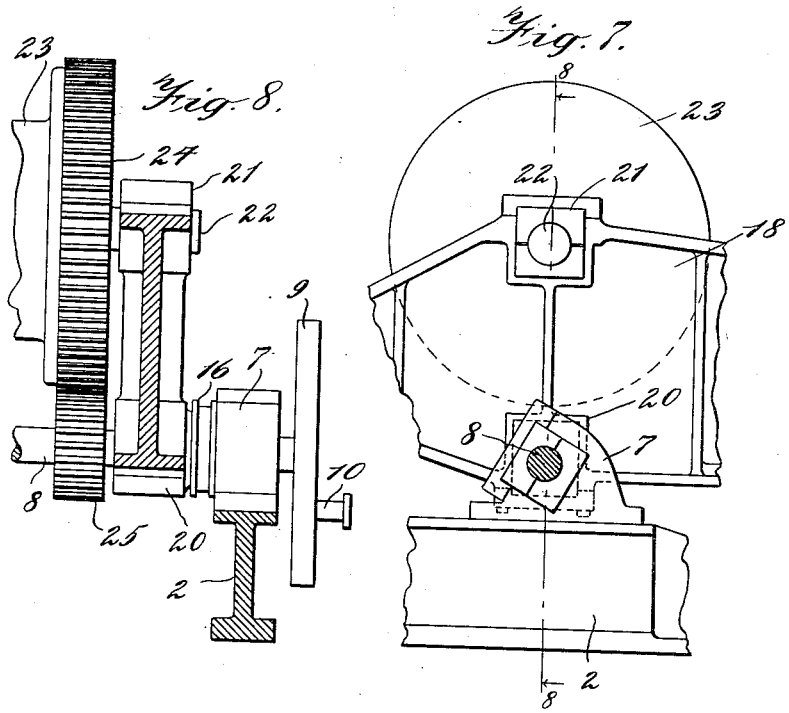
WITNESSES:
INVENTOR.
Thomas Spencer Miller
BY Gifford Bull
his ATTORNEYS

UNITED STATES PATENT OFFICE.

THOMAS SPENCER MILLER, OF SOUTH ORANGE, NEW JERSEY.

TOWING-ENGINE.

1,320,023. Specification of Letters Patent. Patented Oct. 28, 1919.

Application filed February 19, 1918. Serial No. 218,158.

*To all whom it may concern:*

Be it known that I, THOMAS SPENCER MILLER, a citizen of the United States, residing at South Orange, in the county of Essex and State of New Jersey, have invented certain new and useful Improvements in Towing-Engines, of which the following is a specification.

My invention relates to new and useful improvements in towing engines of that type originated by me, in which the towing line or hawser is wound or held on a revoluble drum which is driven and controlled by a motor which is automatically operated to pay out the hawser when the tension on the same is increased, and to take up the hawser when the tension is decreased, whereby a substantially uniform tension on the hawser may be maintained as set forth in my prior application Serial No. 177,072, filed June 26, 1917.

My invention consists in the novel construction of parts and in the arrangement thereof in operative combination, to be more fully described hereinafter, and the novelty of which will be particularly pointed out and distinctly claimed.

I have fully and clearly illustrated my invention in the accompanying drawings, to be taken as a part of this specification, and wherein Figure 1 is a top plan view of one embodiment of my present invention;

Fig. 2 is a view in side elevation thereof;

Fig. 3 is a longitudinal section through one form of controlling valve for that embodiment of the invention in which a fluid pressure motor is employed for operating the drum;

Fig. 6 is a view in side elevation of the embodiment shown in Fig. 4;

Fig. 7 is a detailed view, partly in section, of a portion of the structure shown in Fig. 1;

Fig. 8 is a detailed section on the line 8—8 of Fig. 7, and

Fig. 9 is a detailed view of the controlling valve and its operating connections adapted to the embodiment of the invention shown in Fig. 4.

Figure 4:
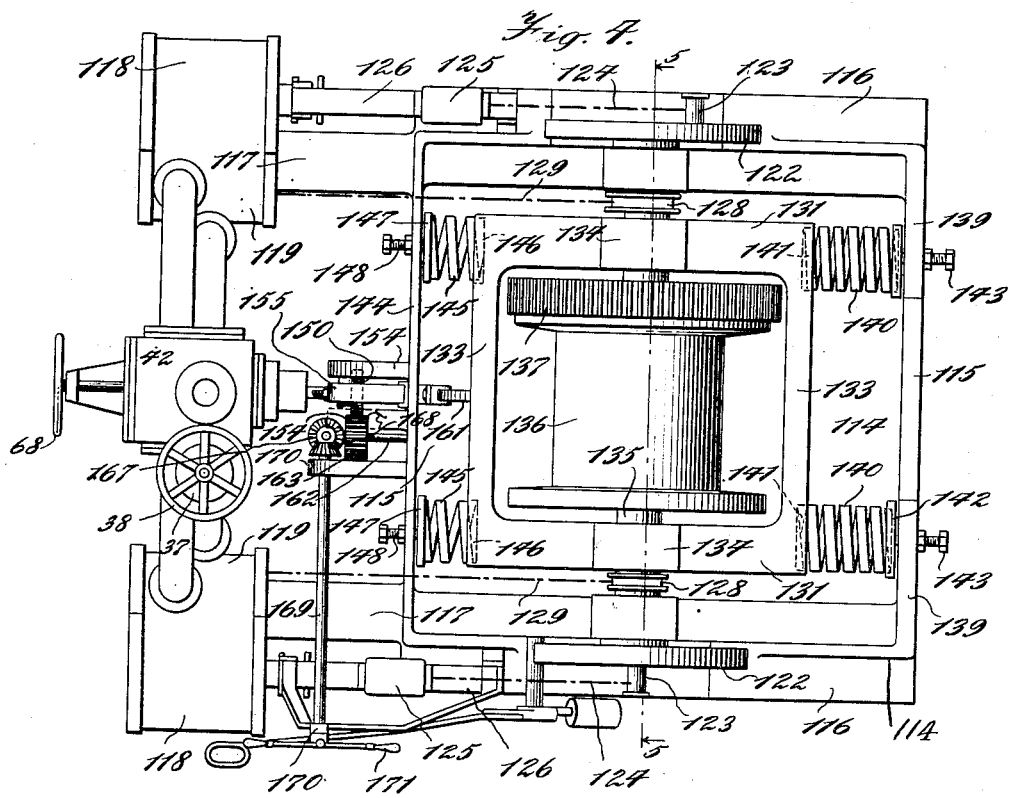
Fig. 4 is a plan view of another embodiment of the same invention.
Figure 5:
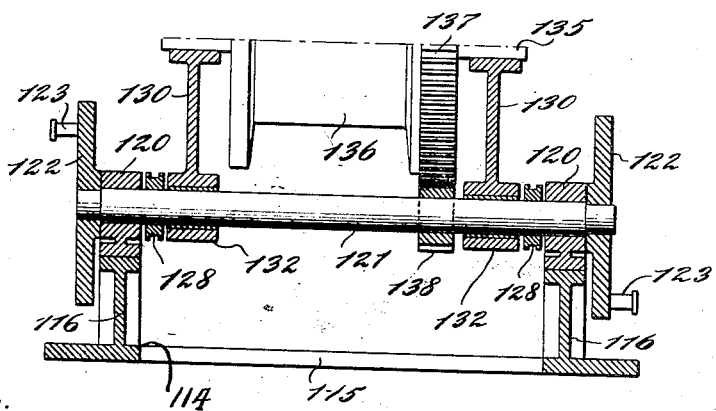
Fig. 5 is a section on the line 5—5 of Fig. 4.

Referring to the drawings by characters of reference, and particularly to Figs. 1, 2 and 7, 1 designates generally a bed or base frame, preferably consisting of a base plate adapted to be secured on a deck or other part of a ship structure (not shown) by any suitable means. This base plate preferably consists of parallel side members 2, and end or cross members 3, parallel to each other and connecting said side members 2, thereby providing a rigid rectangular frame, for example as shown in Fig. 1. The base plate or frame is provided with rearwardly extending frame members 4, forming extensions of the side members 2, and which support the cylinders 5 and their respective valve chests 6 of a steam engine, which functions as will be hereinafter described.

Mounted on the upper sides of the side members 2 are alining bearings or journal boxes 7, of any suitable construction, and in which is journaled a horizontal power shaft 8 carrying crank members 9 on its ends outside the frame members 2. The crank members 9 are each provided with a crank pin 10 and are connected by pitmen, indicated by dot and dash lines 11 in Figs. 1 and 2, to piston rods 12 (see Fig. 2), which in turn are connected to pistons (not shown) in the engine cylinders 5. The piston rods 12 may be each connected to a cross-head 13 sliding on a slideway 14 in a well known manner. The slide valves (not shown) in the valve chest 6 are connected respectively by connecting rods indicated at 15, in dot and dash lines, to eccentrics 16 on the said power shaft 8, whereby the slide valves are operated. I desire it understood that I do not limit my present invention to a steam-engine, or to one of the particular types briefly described, as my invention not only contemplates the use of any form of steam-engine, which is suitable, but also any type of motor which will perform the desired function to be hereinafter described.

I will now proceed to describe the novel construction of the winding drum, and the combination of elements of mechanism whereby the drum operates to pay out the towing line wound thereon when the tension on the said line increases, and to wind up or take in said line when the tension thereon decreases, with the result that the said line is maintained at a substantially constant tension, and relieved from undue or excessive strains tending to break it. For this purpose the drum is mounted in a novel manner so as to shift its axis under increases and decreases in line tension, and I may also employ resilient or yielding means, for example spring means, opposing movement of the drum axis in one direction under increase of tension in the line, and also operating to move the drum axis in the other direction when the tension in the line decreases. The movements of the drum axis described serve as a detector of changes in tension in the towing line, and are utilized to control the operation of the motor to cause it to drive the drum to take up the line when the tension on the latter decreases, and to relieve the pressure in the cylinders to permit the motor to run free, to permit the drum to pay out the line under increase in tension, as heretofore stated.

In the embodiment shown, 17 designates a rectangular frame consisting of vertical parallel side members 18 and transverse parallel members 19 connecting said side members 18, said side members being each provided with a bearing 20 receiving and mounted on the power shaft 8, whereby said frame is adapted to rock or swing horizontally on the said power shaft as a fulcrum. The side members 18 are provided, preferably at their upper portions, with bearings 21, in which turns a horizontal drum shaft 22 carrying a flanged winding drum 23 keyed to said shaft, said drum being located inside said frame 17. This drum 23 is adapted to have wound thereon a towing line which connects the tow-ship to the towed ship. The drum 23 is provided at one end with a gear 24 which meshes with a driving gear 25, shown in dotted lines in Fig. 2, and also in Fig. 8, said driving gear being fixed to the driving shaft 8. By the gearing described the drum may, under certain conditions, be held against rotation by the motor, and under other conditions the drum may be driven to take up the towing line.

The drum frame 17 and the drum carried thereby are movable on the shaft 8, the movement of the same in the outhauling or pulling direction of the line being opposed by cushioning or yielding means, preferably in the form of coil springs 26, arranged between and exerting their force against the lower forward end of the frame 17 and the base frame member 3. The springs 26 are of such strength as to oppose the forward or downward movement of the drum frame yielding to the varying stress of the towing hawser, thus permitting the drum frame to move forward in the outhauling direction and correspondingly shifting the bearing axis of the drum. Should the tension or pull on the tow line drop, the springs exert their force to move the drum frame and the drum in the opposite direction, to raise or lift the forward end of the frame and swing it together with the bearing axis of the drum in a backward and upward direction. The lower end of each of the springs 26 is preferably seated on a spring seat 28 on the frame member 3, while the upper end is seated in a compression or cap plate 29, the latter being adjustable by means of a threaded bolt 30 threaded through the frame 17 and operable to regulate the force of the spring. The bolts 30 may be provided with lock nuts 30ª threaded thereon, and adapted to hold the bolt and the cap plate 29 in adjusted position.

I may, and preferably do, provide auxiliary cushioning devices in the form of springs 31, which exert their force upon the drum frame to cushion and steady the movements of the latter, hold it against and under the influence of the springs 26, and also to cushion any sudden drop of the rear portion of the frame which may result from breaking of the tow line or sudden, abnormal decrease of tension therein. These springs 31 are arranged between the rear end of the frame 17 and the base frame 2, the lower end of each spring being preferably arranged on a seat 32 similar to said seat 28, and the upper end of each of said springs being engaged by an adjustable spring cap 33 which is operable by a bolt 34 threaded through the frame 17, as at 35, 36, to regulate the force of said spring. The bolts 34 may each be provided with lock nuts 34ª to hold them in adjusted position.

It will be seen that the drum and frame will be movable under changes of tension in the towing line wound on the drum, increases of tension serving to pull said frame forward or downward in the outhauling direction, opposed in this movement by the springs 26, while the slackening of the towing line will result in the springs exerting their force to raise the drum frame and move it and the drum in the inhauling direction, which latter movement is cushioned by the springs 31, it being understood that the force of the springs 31 is adjusted to be less than that of the springs 26. The springs 26 are so regulated as to be under compression or active under a predetermined normal pull on the line, so that a slight reduction in said pull or tension will result in the spring force exceeding said pull and thereby lifting the forward end of the drum frame.

This movement of the drum under changes of tension in the towing line is utilized to operate the controlling valve for the engine to control the supply of fluid pressure, so that when the tension on the line increases the pressure in the cylinders is reduced or relieved to permit the engine to run free until the line tension is normal, and when the tension on the line falls below normal the supply of fluid pressure is increased and the cylinders operate to drive the drum to wind in the towing line until the tension is increased to normal. This result is accomplished in the embodiment shown by the control of a controlling valve for the fluid pressure, which will now be described, referring particularly to Figs. 1 and 3. 37 designates a throttle valve of any suitable type controlled by a hand-wheel 38 to control the supply of steam from any suitable source. It is not necessary to show the connections between the source of pressure and the valve, but such connections may be applied to the inlet end of said valve indicated at 39. The outlet branch 40 of the throttle valve is connected to the inlet duct 41 of the casing 42 of a reversing valve forming part of the controlling valve structure. This reversing valve comprises the vertical casing 42 divided by a vertical partition 43 into cylindrical chambers 44, 45, the latter being connected by oppositely disposed conduits 46 with the valve chests 6 of the engine cylinders, one of said conduits being indicated in dotted lines in Fig. 3, and both being shown in full lines in Fig. 1. In the chamber 44 is a cylindrical valveway having upper and lower sets of openings 47, 48, and intermediate openings 49, communicating respectively with annular steamways 50, 51 and 52, respectively. The steamway 52 opens to the main steam line supply pipe through the said throttle valve 37; the steamway 50 to exhaust pipe 53 from the cylinder valve chests 6, and the steamway 51 communicates with a port 54, leading to a cylindrical valveway 55 opening at its upper end into the chamber 45, and at its lower end into a port 56, opening through the valveway heretofore described into the exhaust chamber 57 in the valve casing, the latter also communicating with the exhaust passage 50, as shown in Fig. 3. The upper and lower ends of the valve chamber 44 are connected by means of the by-pass or exhaust chamber 57 by means of the ports 58, 59, and the annular passages 60, 61. The main exhaust connection is shown at 62. In the cylindrical cage 44 is arranged a double piston valve having heads 63, 64, connected by a reduced portion 65, the heads being so spaced that when the valve is moved the space between the heads will span either the openings 48, 49, or the openings 47, 49, so that in the first position the exhaust ports 53 of the cylinder valve chests 6 will be connected to the exhaust 62 of the casing on the one hand, and the steam inlet 41 with the port 54 on the other hand, while in the second position the steam inlet 41 will be connected to the port 47 to reverse the flow of the steam to the engine cylinders, and the passage 48 will be connected to the exhaust. This piston valve is provided with an extension rod 66 extending through a stuffing box 67 in the head of the valve casing, such rod being threaded through a hand-wheel nut 68 rotatably mounted on the casing, said hand-wheel being operable to shift the valve to either of the positions above set forth, and said rod 66 being held against rotation by any suitable means, for example as shown in my said prior application. In the cylindrical valveway 55 is a puppet valve consisting of a hollow shell having a head 69 normally located in the chamber 45 and adapted to coöperate with the upper edge of the said way 55 to control the flow of steam between the chamber 45 and the port 54. This hollow valve is formed at its lower end with an annular piston head 70 connected to the head 69 by a reduced stem 71, which permits passage of steam around said valve in passing from port 54 to the chamber 45. The head 70 terminates at its lower end within the passage 56, so that the chamber 45 communicates with said passage 56 under conditions to be described presently. The puppet valve is normally urged toward its seat by expansion spring 72, seated at one end on said valve, and said spring having its opposite end seated in a spring plate 73 having a part 74 slidable in an opening 75 in the head of the casing and engaged by an adjusting bolt 76 threaded through the head of the casing and operable to regulate the expansive force of the spring. Arranged in the valveway 55 beneath the head 70 of the puppet valve is a piston head 77, which is adapted to either engage the lower end of said head 70 to cut off communication between the chamber 45 and the passage 56, through the puppet valve, or to be moved away from said head to permit free communication between said chamber and passage. This piston 77 is carried by a stem 78, having at its lower end an enlarged cylindrical portion 79, slidably disposed in the head 80. The portion 79 of the said stem 78 is connected to a vertical threaded rod 81, having a spherical upper end, by a ball and socket joint. The rod 81 has a squared lower end 82 seated in a correspondingly formed seat 83 in the frame 2 to prevent turning of the said stem, but permitting vertical reciprocation thereof. On this rod 81 is threaded a pinion nut 84 having a collar 85 straddled by a yoke 86 on one end of the lever 87, fulcrumed intermediate its ends as at 88 on the main frame. The end of the lever 87 opposite to that bearing the yoke 86 is provided with a longitudinal slot 89, in which is slidably disposed a block 90 bearing a transverse pivot pin 91, which is straddled by a yoke 92 carried by the lower end of a threaded rod 93 connected by a turn buckle or sleeve 94 with a threaded rod 95, which in turn is pivoted as at 96 to a bracket or extension 97 on the movable drum frame. The block 90 is threaded on a threaded rod 90ᵃ rotatably mounted in bearings 90ᵇ, in said lever, whereby the block is adjustable lengthwise of said lever. By this arrangement it will be seen that whenever the forward portion of the frame 17 is lowered, due to sufficient tension in the towing line to overcome the opposing force of the spring 26, the rear portion of said frame 17 will be raised, thereby lifting the bracket 97, which results in the raising of the rear end of the lever 87 and the lowering of the yoke 86, the latter movement serving to lower the valve head 77 from engagement with the head 70.

The sliding adjustable connection, consisting of a screw 90$^a$ and a block 90, permits the proper adjustment of the valve so that it will operate properly when the frame 17 rises and lowers under the changes in tension of the towing line. It will be seen that the block 90 may be moved in either direction lengthwise of the slot 89 by means of the screw 90$^a$ to vary the extent of swing of the lever 87 and consequently the extent of movement of the piston head 77.

Arranged parallel to the rod or stem 81 is a vertical shaft 98 carrying a pinion 99 in mesh with the pinion 84 on said stem, said first named pinion being long enough to be in constant driving engagement with the pinion 84 during all positions of movement or adjustment of the latter. On the shaft 98 is a beveled gear 100 meshing with a beveled gear 101 on one end of a horizontal connecting shaft 102, said shaft carrying on its opposite end a beveled gear 103 meshing with a beveled gear 104 on the lower end of the vertical shaft 105, mounted in bearings 106 on the valve casing. The shaft 105 carries on its upper end a pinion 107 meshing with a beveled gear 108 on the end of a horizontally disposed shaft 109, mounted in bearings 110 and carrying at one end a hand-wheel 111, by which it may be revolved. This arrangement provides means for the manual adjustment, regulation and operation of the puppet valve independent of the automatic means consisting of the rocking movement of the drum, and is particularly useful for the adjustment of the valve when setting it for the desired in-pulling power, so that the steam pressure will be properly regulated by the automatic control.

The construction and arrangement being as above described, the operation is as follows: The towing engine is constructed to automatically take in and pay out a hawser so as to maintain an approximately constant pull thereon, which pull can be regulated by the operator within a range of say from 5000 to 25,000 pounds, or more. If, for example, the engine be regulated so as to exert a pull of 20,000 pounds on the towing line at a pressure of 120 pounds steam pressure in the engine cylinders, and the valves are in substantially the position shown in Fig. 3, when steam is turned on through the throttle valve 37 the engine will revolve the drum to take up the towing line, and will continue this winding operation until the strain on the towing line increases toward 20,000 pounds. During the winding operation the swinging frame 17 carrying the drum will be held in raised position above the bed-plate by means of the springs 26. It will be understood that the springs 26 will have an initial compression due to the force exerted by springs 31, and will not be further compressed until the cable stress is applied. When the pull on the towing line approaches the determined amount, say 20,000 pounds, said pull will serve to gradually depress the frame 17 in the outhauling direction against the force of the springs 26 this downward movement or depression of the forward part of the frame serving to lift the rear portion of the same and operating the valve controlling connections to permit the valve head 69 to seat, for an instant only, and cut off the supply of steam to the engine cylinders, and if continued the piston 77 will be hauled downward, opening the cylinders to the exhaust. The steam pocketed in the cylinders 5 will act as a cushion only to the degree which is required, the exhaust port being instantly closed when the resistance to paying out is reduced slightly below normal, and valve head 69 raised slightly to supply the required steam pressure. The point at which the valve 69 closes is determined by the preliminary vertical adjustment of said valve, relative to its seat, through the operation of the hand-wheel 111 shifting the valve stem 81 by means of the nut 84. This operation, i. e., adjustment of the valve, having taken place, the frame 17 normally maintains a position relative to the bed-frame, corresponding to the desired pull on the towing line, so that increases in the tension on the towing line will serve to further depress the drum frame against the force of the springs 26, while decreases in tension will result in the force of said springs being exerted to lift the forward end of the drum frame. Should the change of tension on the towing line be increased, and the forward end of the frame consequently depressed, the rear end of the frame will be raised, lifting the one end of the lever 87 and lowering the opposite end, and consequently the valve stem 81, thereby moving the valve head 77 down so as to separate it from the puppet valve head 70, the result being that the chamber 45 will be opened to the exhaust port 56 through the hollow puppet valve and the space provided between the lower end of the latter and the head 77, and the steam will be permitted to escape from the engine cylinders. The escape of the steam from the engine cylinders permits the pull on the towing line to overhaul the engine without increasing the steam pressure in the cylinders, until the tension on the towing line drops to the point determined, whereupon the previously depressed springs 26 will raise the forward end of the frame, and through the valve connections cause the stem 81 and the head 77 to rise, until said head 77 meets the head 70 and closes communication between the chamber 45 and exhaust port 56 through the puppet valve, thus maintaining the steam in the engine cylinders at the required pressure to cushion the pistons and thereby maintain the desired pull on the towing line. By the operation of the hand-wheel 111 in either direction the connections between the frame 17 and the puppet valve may be changed to regulate the point at which the controlling valve closes, so that the towing engine may be regulated to pull any amount within the limits of capacity of the engine.

Should a decrease in tension in the towing line take place the springs 26 will raise the forward end of the frame 17 and thereby depress the forward end of the lever 87, raising the rear end thereof, which serves to lift the stem 81 and consequently the valve head 69 from its seat, so that the steam inlet through the throttle is opened through the port 54 and the valveway 55 to the chamber 45, and the steam is permitted to flow into the engine cylinders to move the pistons therein to drive the drum in a direction to wind the rope thereon and restore the determined tension in the towing line. When the desired tension is reached the forward portion of the frame is again depressed against the force of the springs 26, and the valve stem 81 is thereby depressed to permit the steam pressure and the spring 72 to move the valve 69 toward a closed position. The description of the operation just given applies to the operation of the towing line after the same has been connected to the tow, and it will be understood that in connecting up the towed vessel with the towing vessel that the automatic valve does not function.

When it is desired to pay out the towing line to connect it to the towed vessel, the hand-wheel 111 is operated to set the puppet valve 69 to cause the engine to pull say 4000 lbs., which raises the puppet valve from its seat and establishes communication between the chamber 44 and the port 54. The double headed piston valve 63, 64, is raised to bridge the ports 50 and 51, thus communication is established between the steam supply and the conduit 55 to the cylinders. The flow of steam is therefore reversed from what it is during the towing operation, and the engine may be operated to pay out the towing line.

If desired, one of the crank disks on the power shaft may serve as a brake wheel, and for this purpose may be encircled by a brake-band 112 operable by a foot lever 113 to retard operation of the driving shaft 8, when the towing line is being paid out.

In Figs. 4, 5, 6 and 9 I have shown another embodiment of the same invention which I will now describe. 114 indicates the bed-frame, consisting of transverse parallel members 115 and longitudinal parallel side members 116 extending rearwardly with the members 116, and in line therewith are frame members 117, upon which are mounted the engine cylinders 118 and their respective valve chests 119. On the side members 116 are bearings 120, in which is mounted a power shaft 121 carrying on its ends crank disks 122, having crank pins 123 connected to pitmen 124 to cross-heads 125 sliding in guides 126, and which are connected by the piston rods 127 with the pistons (not shown) in the steam engine cylinders 118. Mounted on the power shaft are eccentrics 128 connected by connecting rods 129, shown in dot and dash lines in Fig. 4, to the slide valves in the valve chambers 119. On the power shaft 121, in substantially the same manner as heretofore described with reference to the frame 17, is a rectangular frame 130 having side parts or members 131, having at their lower ends bearings 132 mounted on the said shaft 121. The side bars or members 131 are connected by parallel transverse members 133, thereby forming a rectangular frame. This frame is adapted to rock in the outhauling and inhauling direction on said shaft 121 as a fulcrum. On the side members 131 are bearings 134 to receive a drum shaft 135, upon which is mounted a flanged drum 136. The drum carries a driving gear 137 which meshes with a gear 138 on the power shaft, whereby an operative connection is provided between said power shaft and the drum. Rising from the front of the main frame are two standards or pillars 139, between which and the forward member 133 are arranged expansion springs 140 which perform the same function as the springs 26 heretofore described. One end of each of the springs 140 is seated in a socket 141 in the forward end of the frame, and the opposite end is seated in a spring cap 142 engaged and carried by an adjusting bolt 143 threaded through the said standard 139. The bolts 143 are operable to regulate the force exerted by the said springs 140. Rising from the rear of the main frame is a transverse member 144, between which and the drum frame are arranged springs 145 which serve the same purpose as the springs 31 described with reference to the form of the invention shown in Figs. 1 and 2. One end of each spring 145 is seated in a recess or spring seat 146 in the drum frame, and the other end is seated in a spring cup 147 carried by an adjusting bolt 148 threaded through the said member 144 and operable to regulate the force of said spring 145. In the operation of the device, increases in tension of the line above that predetermined, or which is normal, move the drum frame and the drum forward against the force of the springs 140, while decreases in the tension of the towing line below normal result in the springs 140 exerting their force to swing the drum and the drum frame rearward, or in the inhauling direction. These two movements are employed in the same manner as heretofore described to control the steam pressure and steam supply to the engine cylinders 118, a valve of substantially the same construction being employed for this purpose as heretofore described.

For convenience in arrangement I preferably arrange the controlling valve in horizontal position, as shown in Figs. 4, 6 and 9, instead of in vertical position, as shown in Figs. 1, 2 and 3. The connection between the drum frame and the valve is as follows: The valve stem or shaft 149 corresponding to the stem 81, heretofore described, carries a gear 150 threaded on said shaft 149. This gear carries a collar 151 to which is connected one end 152 of a bell-crank lever fulcrumed as at 153 on a bracket 154 projecting rearwardly from the frame member or standard 144; the opposite member 155 of the bell-crank lever is provided with a longitudinal slide 156, in which slides a block 157 to which is pivotally connected a yoke member 158 connected by a turnbuckle 159 with a yoke member 160, which is pivoted to a bracket 161 on the rear frame member 133 of the drum frame. The block 157 is adjustable lengthwise of the slide 156 by means of a screw 157ª turning in bearings 157ᵇ in the said bell-crank lever, said screw carrying a wrench head 158ª adapted to be engaged by a wrench whereby the screw is turned. This arrangement provides for the proper adjustment of the valve so that it will operate properly when the drum frame swings on its fulcrum. In view of the fact that the movements of the drum frame operate the controlling valve in the same manner as that heretofore described in connection with the embodiments shown in Figs. 1, 2 and 3, it is not necessary to repeat the operation of the valve.

Turning in suitable bearings in the main frame is a shaft 162 carrying a large pinion 163 of sufficient length to continuously mesh with the gear 150 throughout movement of the latter lengthwise of the valve stem. On the shaft 162 is a beveled gear 164 meshing with the beveled gear 165 on the lower end of the vertical shaft 166, which has at its upper end a beveled gear 167 meshing with a beveled gear 168 on the inner end of the operating shaft 169 turning in bearings 170 on the main frame. The shaft 169 carries a hand-wheel 171 by means of which the shaft 169 is turned to operate the regulating valve in the same manner as hand-wheel 111 and shaft 109, heretofore described.

One of the crank disks 122 may be provided with a brake band 172 operable by a foot lever 173 to retard the power shaft for the same purposes described with reference to the brake 112.

In towing engines internal friction of the towing engine and its parts has hitherto constituted an important consideration which could not be disregarded, because it, together with the steam pressure, constitute the two forces which oppose the hawser stress, but one of the advantages of my invention is that within reasonable limits this internal friction may be ignored. By way of explanation, suppose a towing machine could be built which would be frictionless and that it would oppose a 30,000 pound hawser stress at 100 pounds steam pressure, in which case the only force opposing the hawser stress would be the force exerted by the steam pressure. In actual practice, however, in an engine of the capabilities mentioned, about 30% (thirty) of the force afforded by the steam pressure would be expended in overcoming the friction in the machine, so that but 21,000 pounds pull would be available to haul in the hawser. Should the hawser pull exceed 21,000 pounds it might go as high as the theoretical force exerted by the steam engine—*i. e.*, 30,000 pounds, plus the force expended in overcoming friction—*i. e.*, 9000 pounds, which equals 39,000 pounds—that is, the hawser might build up as high as 39,000 pounds before it would overhaul the machine and could become slackened, which obviously would result in an extraordinary over-strain in the hawser which might result in the breaking of the latter. These conditions cannot take place in my invention, because the steam pressure is immediately reduced in the cylinders as soon as there is an increase of cable stress above 21,000 pounds. When the hawser pulls beyond 21,000 pounds the steam is reduced, the hawser is then opposed by the friction of the machine, say 9000 pounds, and a reduced pressure of steam, say about 12,000 pounds. Then if the hawser pull slackens say to 20,000 pounds, the valve opens and the steam pressure is again increased in the cylinders, causing the engine to wind up the hawser until its stress is again raised to normal, whereupon it is held by the engine until there is either an appreciable drop or rise in the hawser stress. The advantage of this is apparent, because I am able to disregard the friction within reasonable limits as the total force of the friction and steam pressure can never exist simultaneously in opposition to the hawser when the hawser stress builds up over the determined normal, inasmuch as the steam pressure is immediately reduced whenever the hawser stress rises above normal and there is consequently no force but the friction plus the amount of steam pressure permitted to, exist by the opening of the controlling valve in proportion to the degree to which said valve is open. All of the above has assumed that there be no friction in the elements necessary to communicate the movement of the drum frame to the valve. It is clear that the more frictionless these elements are the more nearly uniform can the hawser stress be maintained. However, for practical reasons a slight increase in hawser stress when the engine is being overhauled is advantageous because in smooth seas slight raises in hawser stress will not require any movement of the engine. This effects a saving of steam.

For example: a winding-in hawser stress of about 18,000 pounds and an outhauling hawser stress of about 22,000 would mean that the engine would stand still until the hawser stress exceed 22,000 pounds, on the one hand, or dropped below 18,000, on the other. The difference in hawser stress in above example is 4000 pounds. If the difference in hawser stress is much greater than 4000 pounds, then stronger and heavier hawsers must be provided.

What I claim and desire to secure by Letters Patent of the United States is—

1. In a towing engine, a winding drum, a support for the drum whereby the axis of the drum is movable laterally, a motor supported independently of the drum support, means whereby lateral movement of the axis of the drum under increases and decreases in pull of a hawser operated by said drum controls the motor to reduce the pulling power of the motor when the pull of the hawser increases, and to increase the pulling power of the motor when the pull of the hawser decreases.

2. In a towing engine, a winding drum, a support for the drum whereby the axis of the drum is movable laterally, a motor supported independently of the drum support, a controller for the motor, and means whereby the movement of the axis of the drum under increases and decreases in pull of a hawser operated by said drum operates the controller to control the motor to reduce the pulling power of the motor when the pull of the hawser increases, and to increase the pulling power of the motor when the pull of the hawser decreases.

3. In a towing engine, a base, a frame movably mounted on said base, a drum having bearings on said frame, a motor mounted on said base, and having driving connection with said drum, and controlling means for the motor operated by the movement of said frame.

4. In a towing engine, a base, a frame mounted for back-and-forth movement on said base, a drum having bearings on said frame and movable with the latter, a motor mounted on said base and having driving connection with said drum, and controlling means for the motor operated by the back-and-forth movement of said frame.

5. In a towing engine, a base, a frame mounted for rocking movement on said base, a drum having bearings on said frame, and movable with the latter, a motor mounted on said base and having driving connection with said drum, and controlling means for the motor operated by the rocking movement of said frame.

6. In a towing engine, a motor, a power shaft, a frame rockable about said shaft as a center, a drum carried by said frame and movable therewith, and means whereby the movement of the drum controls said motor.

7. In a towing engine, a motor, a power shaft, a frame fulcrumed on said shaft to rock thereon, a drum carried by said frame and movable therewith, and means whereby the movement of the drum controls said motor.

8. In a towing engine, a motor, a power shaft, a frame fulcrumed on said shaft to rock thereon, a drum carried by said frame and movable therewith, means whereby the movement of the drum controls said motor, and means yieldingly opposing movement of the drum in one direction.

9. In a towing engine, a motor, a power shaft, a frame fulcrumed on said shaft to rock thereon, a drum carried by said frame and movable therewith, means whereby the movement of the drum controls said motor, means yieldingly opposing movement of the drum in one direction, and means cushioning movement of the drum in the opposite direction.

10. In a towing engine, a revoluble drum, a support for the drum bearings movable in two directions, a stationary fluid pressure engine for operating the drum, a valve controlling supply of motive agent to the engine, and means whereby movement of the drum bearings in one direction operates said valve to increase the supply of motive agent to the engine, and movement of said bearings in the other direction relieves the pressure of motive agent in the engine.

11. In a towing engine, a base, a power shaft having bearings on said base, a frame mounted on said shaft for rocking movement, a drum having bearings on said frame, a motor, a controller for the motor, and means whereby the movement of the said frame controls the motor.

12. In a towing engine, a base, a frame mounted to have a back-and-forth movement on said base, a drum having bearings on the frame, an abutment rising from said base, yielding means between said drum frame and abutment, a motor for driving the drum, and means whereby the movement of said drum frame controls said motor.

13. In a towing engine, a base, a frame mounted to rock on said base, a drum having bearings on the frame, abutments rising from said base and in front and rear of the said frame, yielding means between said drum frame and abutments, a motor for driving the drum, and means whereby the movement of said drum frame controls said motor.

14. In a towing engine, a base, a frame mounted to rock on said base, a drum having bearings on the frame, abutments rising from said base and in front and rear of the said frame, yielding means between said drum frame and abutments, a motor for driving the drum and mounted on said base, and means whereby the movement of said drum frame controls said motor.

15. In a towing engine, a base, a frame mounted to rock on said base, a drum having bearings on the frame, abutments rising from said base in front and rear of said drum frame, yielding means between said drum frame and abutments, a motor mounted on said base, a power shaft having bearing on the base and having driving connection with said motor, and means whereby the movement of said frame controls said motor.

In testimony whereof I have hereunto signed my name in the presence of two subscribing witnesses.

THOMAS SPENCER MILLER.

Witnesses:
PRIOR SINCLAIR,
CHAS. G. MUNIER.